(12) United States Patent
Pickering et al.

(10) Patent No.: US 7,545,270 B2
(45) Date of Patent: Jun. 9, 2009

(54) CAPACITIVE PROXIMITY SENSOR WITH USER

(75) Inventors: Carl A Pickering, Kenilworth (GB); Ian R Thorp, Cambridge (GB); Richard D Parkinson, Cambridge (GB)

(73) Assignee: Jaguar Cars Limited (GB)

( * ) Notice: Subject to any disclaimer, the term of this patent is extended or adjusted under 35 U.S.C. 154(b) by 403 days.

(21) Appl. No.: 10/568,333

(22) PCT Filed: Aug. 9, 2004

(86) PCT No.: PCT/GB2004/003420

§ 371 (c)(1),
(2), (4) Date: Feb. 13, 2006

(87) PCT Pub. No.: WO2005/017727

PCT Pub. Date: Feb. 24, 2005

(65) Prior Publication Data

US 2008/0169936 A1    Jul. 17, 2008

(30) Foreign Application Priority Data

Aug. 14, 2003 (GB) .................................. 0319056.8

(51) Int. Cl.
*G08B 13/26* (2006.01)
(52) U.S. Cl. ....................... 340/561; 324/663; 340/562; 345/7

(58) Field of Classification Search ................. 340/561, 340/562, 660, 661; 345/7, 173; 324/658, 324/663
See application file for complete search history.

(56) References Cited

U.S. PATENT DOCUMENTS

| 5,784,036 A * | 7/1998 | Higuchi et al. .................. 345/7 |
| 5,923,267 A * | 7/1999 | Beuk et al. ............. 340/825.56 |
| 2002/0038947 A1* | 4/2002 | Baba et al. .................. 280/735 |
| 2003/0009273 A1* | 1/2003 | Stanley et al. .................. 701/45 |
| 2004/0073104 A1* | 4/2004 | Brun del Re et al. ........ 600/372 |

FOREIGN PATENT DOCUMENTS

| GB | 0880442 A1 | 10/1961 |
| GB | 2319997 A | 6/1998 |
| WO | WO 97/29391 | 8/1997 |

* cited by examiner

*Primary Examiner*—Thomas J Mullen
(74) *Attorney, Agent, or Firm*—Brooks Kushman P.C.

(57) ABSTRACT

A sensing system for sensing the proximity of a part of a user to a control input, such as a control panel (14), for a vehicle subsystem (10), includes a transmitter (26) for transmitting a signal, a primary receivers (22) for receiving the signal via the user as a primary signal and a reference receiver (28) for receiving the signal via the user as a reference signal. One of the transmitter and primary receiver is associated with the user and the other with the control input (14). The reference receiver (28) is associated with the user and a controller (12) is provided to receive and process the primary and reference signals to provide a measure of the proximity between the part of the user and the control input (14).

33 Claims, 8 Drawing Sheets

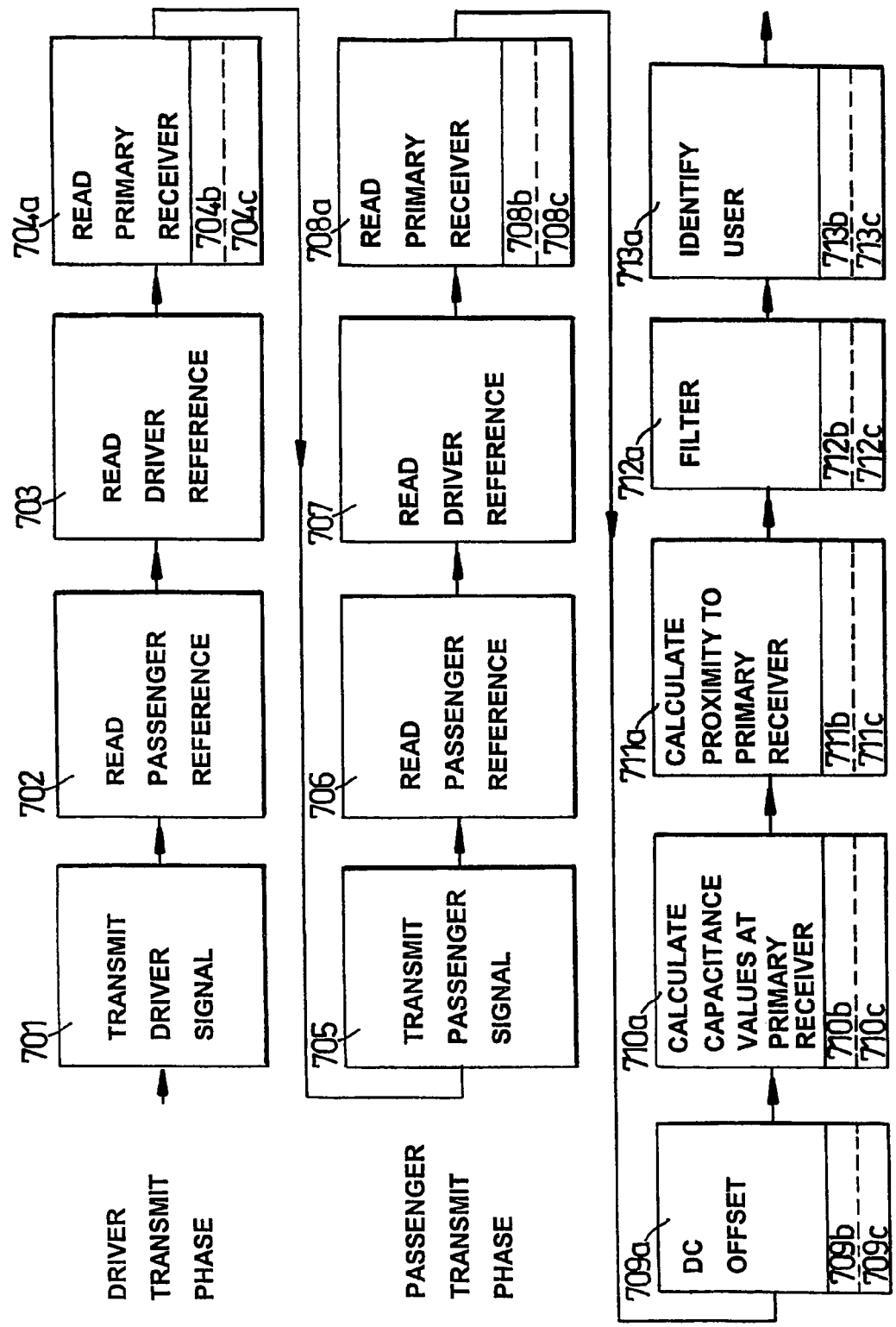

CAPACITIVE PROXIMITY SENSOR WITH USER

This invention relates to the control of vehicle sub-systems, and in particular to the proximity of a user who is operating such vehicle sub-systems.

It is known to provide a vehicle with a user-operated control for operating one or more subsystems of the vehicle, such as for example a manually rotated knob for adjusting the output temperature of a heating and ventilating system. It is also known, for example from U.S. Pat. Nos. 5,923,267 and 5,784,036 to provide sensor arrangements which can detect when an operator's hand is approaching or touching a control and respond by providing information to the operator, for example as a head-up display on a vehicle windscreen or as an audible sign.

According to the invention there is provided a sensing system for sensing the proximity of a part of a user to a control input for a vehicle sub-system, the system comprising a transmitter adapted to transmit a signal, a primary receiver, adapted to receive the signal via the user as a primary signal, one of the transmitter and primary receiver being adapted to be associated with the user and the other being associated with the control input, a reference receiver adapted to be associated with the user and to receive the signal via the user as a reference signal, and a controller arranged to receive the reference signal and the primary signal and to determine from them said proximity.

Outputs of the vehicle's subsystem may then be varied as said proximity varies.

Preferably the controller is arranged to determine from the reference signal the electrical potential, i.e. the voltage of the user. The transmitter may be adapted to transmit an alternating voltage signal, most preferably a sinusoidal alternating signal.

The controller is preferably arranged to use the primary and reference signals to determine a measure of the capacitance between the user and the primary receiver. The controller is preferably arranged to use the measure of capacitance between the user and the primary receiver to determine the separation of said part of the user from the control input. This is possible since, assuming the dielectric properties of the medium between the user and the control input remain constant and the surface area of said part of the user remains constant, the capacitance between the user and the primary receiver will be substantially inversely proportional to said separation.

The reference receiver preferably comprises a high input impedance reference receiver for receiving the reference signal.

The reference receiver preferably comprises a detector circuit arranged to provide a measure of the magnitude and phase of the reference signal. Preferably the primary receiver comprises a detector circuit arranged to provide a measure of the magnitude and phase of the primary signal. A multiplexer is preferably provided to arrange a single detector circuit to provide a measure of the magnitude and phase of the reference signal and the primary signal alternately. The detector circuit may comprise a filter to filter out noise and interference which is not at the frequency of the transmitted signal. The detector circuit may comprise synchronization means arranged to obtain measurements from the primary signal or reference signal in phase with the transmitted signal and 90° out of phase with the transmitted signal.

A buffer circuit is preferably arranged to buffer the reference signal before it is input to the detection circuit.

The reference receiver is preferably connected alternately through different impedances and the reference signal in each case measured to obtain a measure of the voltage on the user substantially independently of capacitance, and therefore distance, between the user and the reference receiver.

Preferably a current input buffer circuit is arranged to buffer the primary signal before it is input to the detector circuit.

The control input preferably comprises a portion arranged to be illuminated in use and the controller may be arranged to vary the intensity of illumination of said portion as the separation of the user from the control input varies. The intensity of illumination of the control input may be adapted to increase as the separation of the user from the control input decreases. The control input may be adapted to become illuminated once the separation of the user from the control input falls below a predetermined threshold value. The control input is preferably adapted to be concealed until the separation falls below the threshold value.

The subsystem preferably comprises a display to present information to a user and a property of the display may be variable with the separation of the user from the control input.

The subsystem may be arranged to provide information to a user in the form of audible information whereby a property of the audible information may be variable with the separation of the user from the control input.

The transmitter preferably comprises a transmitter aerial, the primary receiver preferably comprises a primary receiver aerial and the reference receiver preferably comprises a reference receiver aerial.

The transmitter is preferably in a position arranged to be associated with the user and the primary receiver is preferably adapted to be associated with the control input. Preferably the transmitter is arranged to be mounted in a seat of the vehicle such that the user is a person sitting on the seat. The transmitter aerial may comprise a flexible transmitter plate. The transmitter may further comprise a transmitter shield associated with the transmitter to prevent coupling of the transmitter with the reference receiver or the primary receiver through a route other than via the user.

Preferably the primary receiver is arranged to be mounted at or adjacent to the control input. The primary receiver may comprise a conductive wire mounted around the control input.

The reference receiver is preferably mounted in the seat of the vehicle in a position spaced from the transmitter. The reference receiver aerial preferably comprises a flexible plate. Preferably the reference receiver further comprises a reference shield associated with the reference receiver to prevent coupling between the transmitter and the reference receiver by any route other than via the user.

The control input may be a hand operated input member. The control input may include a screen comprising a conductive layer which forms the primary receiver. Preferably the reference shield and the transmitter shield are electrically grounded. The alternating voltage signal transmitted by the transmitter preferably alternates about ground.

According to the invention there is further provided a system in accordance with the preceding paragraphs for sensing the proximity of a part of any of a plurality of users to the control input comprising transmitter or primary receiver associated with each user and reference receiver associated with each user.

If the primary receiver of the system is associated with the control input, then the transmitter is associated with each user. Alternatively, if transmitter is associated with the control input, then the primary receiver is associated with each user.

Preferably the controller is arranged to alternately calculate the proximity of each user from the control input. The multiplexer may be provided to arrange the single detector circuit to provide a measure of the magnitude and phase of the reference signal and the primary signal alternately from each user. By measuring the voltage on each user and obtaining a measure of the capacitance between each user and the primary receiver, it is possible to determine a measure of the proximity between each user and a control input which allows the control system to obtain an indication of which user, if any, is operating the control input.

An embodiment of the present invention will now be described, by way of example only, with reference to the accompanying drawings in which:

FIG. 7 is a flow diagram showing processes of the system in use; and

Figure 1:
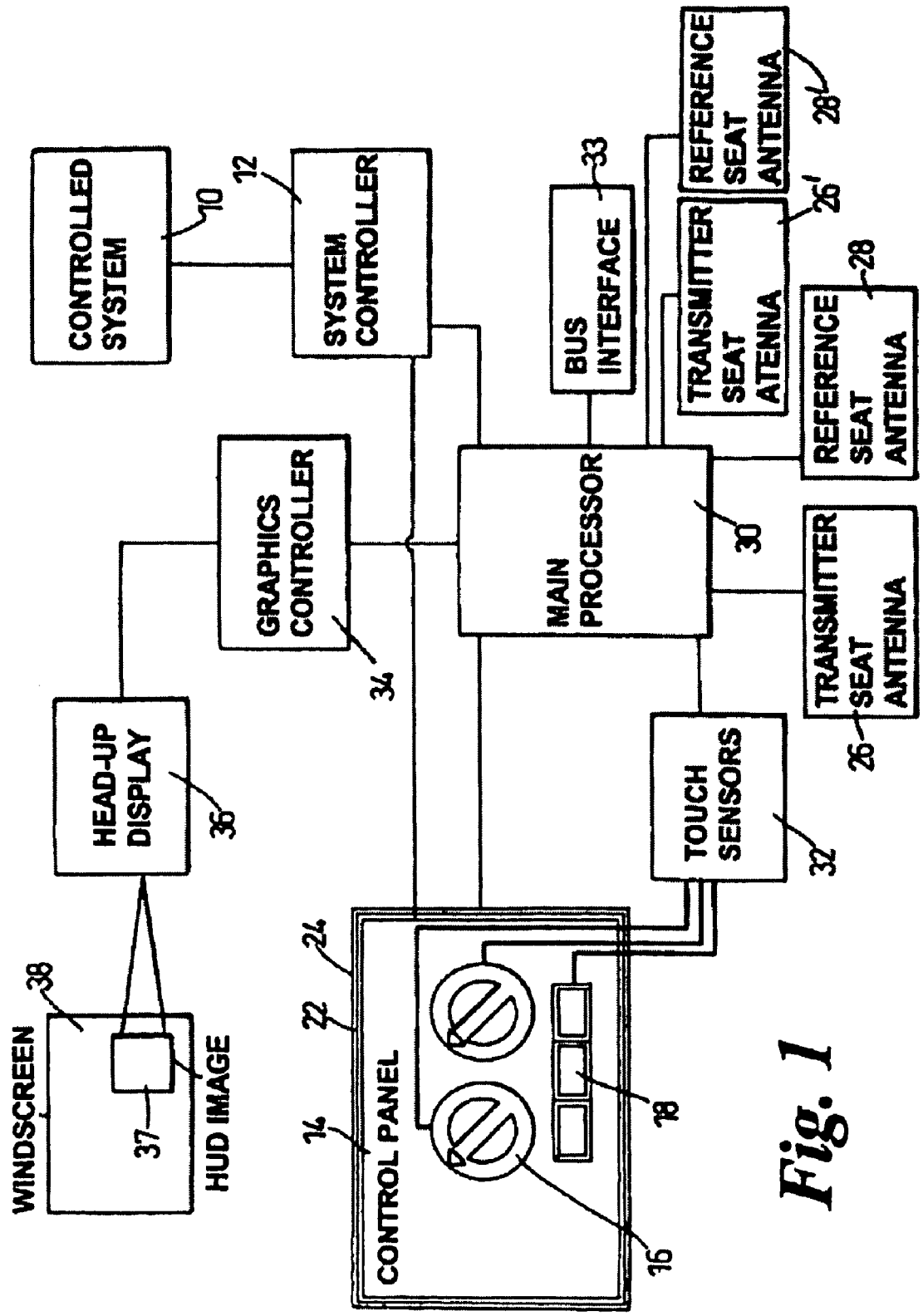
FIG. 1 is a schematic representation of a sensing system and vehicle subsystem.
Figure 2:
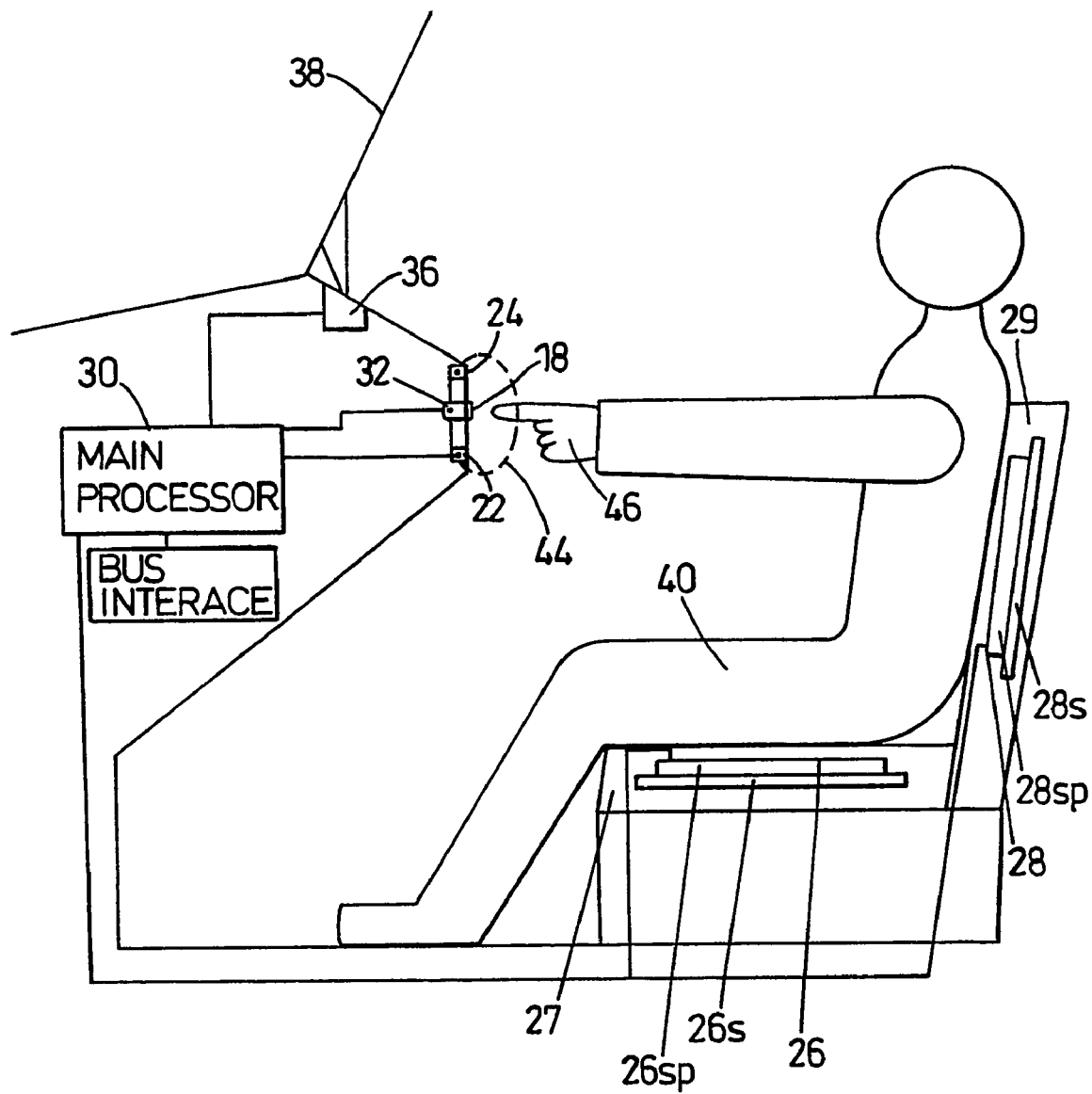
FIG. 2 is a schematic side view of the system incorporated in a vehicle and being operated by a user.
Figure 3:
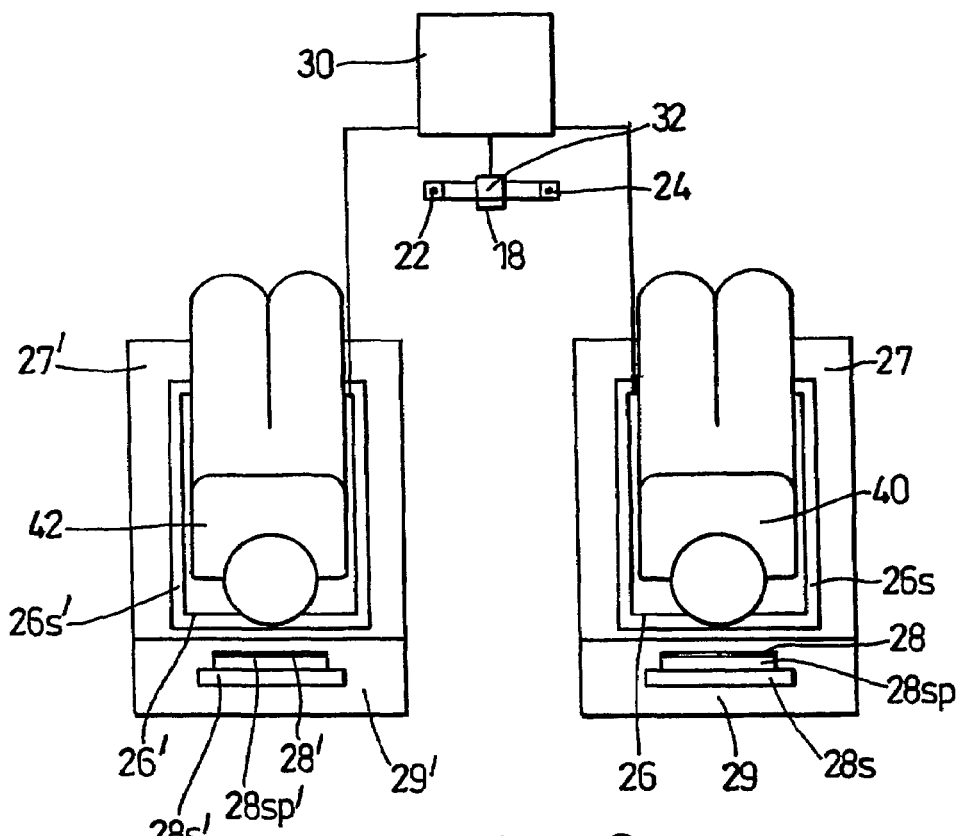
FIG. 3 is a schematic plan view of the system incorporated in a vehicle and being operated by two users.

Referring to FIGS. 1 to 3, a control system for a vehicle subsystem 10, which in this particular embodiment is a heating and ventilating system, comprises a system controller 12 arranged to control operation of the subsystem 10, and a control panel 14, which includes a plurality of user input elements in the form of rotary controls 16 and push button controls 18. The controls 16, 18 are used to control the operation of the subsystem 10, and the system controller 12 receives input signals from the controls 16, 18. A primary receiver antenna 22 in the form of a wire is provided in a bezel 24 around the control panel 14. A transmitter seat antenna 26 in the form of a rectangular double sided, flexible PCB, 315 mm in length and 250 mm in width is provided in a base 27 of the driver's seat of the vehicle. A transmitter shield 26s, in the form of a rectangular plate is provided underneath the transmitter antenna 26. The transmitter antenna 26 and the transmitter shield 26s are separated by a transmitter spacer material 26sp, which has a depth, $d_1$, and is impervious to moisture and humidity. A suitable material for the transmitter spacer 26sp is a flexible plastic substrate. The shield 26s minimizes unwanted coupling of electrical signals transmitted through the transmitter antenna 26 via any route other than the intended route (as described below). The shield 26s is larger than the transmitter antenna 26 and extends beyond the transmitter antenna 26 by a distance of 5 times the spacer material 26sp depth. Typically $d_1$ is 2 mm and in this case a suitable shield would be approximately 335 mm×270 mm. The transmitter antenna 26 is situated within a waterproof envelope, not shown, to prevent direct coupling with the shield 26s if the seat becomes wet. The shield plate 26s is connected to ground.

A reference receiver antenna 28, in the form of a rectangular double-sided PCB, 250 mm in length and 150 mm in width, is provided in a back 29 of the driver's seat of the vehicle. A reference receiver shield 28s, in the form of a rectangular plate is provided behind the reference receiver antenna 28. A reference spacer material 28sp is provided between the reference receiver antenna 28 and the reference receiver shield 28s to provide spacing therebetween. The reference spacer material 28sp is impervious to moisture and humidity—a suitable material being a flexible plastic substrate. The reference receiver shield 28s is approximately 300 mm×200 mm and the depth of the reference space material 28sp is approximately 4 mm. The reference shield 28s minimizes unwanted coupling of electrical signals via any route other than the intended route (as described below). The reference shield 28s also minimizes the unwanted effect of nearby ground structures from lowering the effective input impedance of the reference receiver antenna 28 (which needs to be maintained at a high level as explained below).

Referring to FIG. 3, a similar arrangement of passenger transmitter antenna 26', shield 26s', spacer 26sp', passenger reference receiver antenna 28', shield 28s' and spacer 28sp' are provided in a base 27' and back 29' of the passenger's seat.

The antennae 22, 26, 26', 28, 28' are all connected to a main processor or CPU 30, which is arranged to transmit electrical signals through the transmitter antennae 26, 26' and receive them through the reference receiver antennae 28, 28' and the primary receiver antenna 22 as will be described in more detail below. Touch sensors 32 are also provided in each of the controls 16,18 and are connected to the CPU 30 so that it can detect contact between a user's hand and any of the controls 16, 18.

The CPU 30 is also connected to a graphics controller 34 which in turn is connected to a head-up display unit 36 mounted beneath the vehicle windscreen 38 and arranged to project a display onto the windscreen so that it can be viewed by the driver 40 from the driver's seat. The CPU 30 is also connected to a bus interface 33 so that it can use data available on the vehicle CAN bus.

In use, the CPU 30 applies a sinusoidal signal of frequency 75 kHz and amplitude 10V to the driver and passenger transmitter antennae 26,26', and monitors the signals received from each of the primary receiver antenna 22 and the driver and passenger reference receiver antennae 28 at that frequency. This sequence of events is described in more detail below. Whilst neither the driver 40 or passenger 42 are operating the controls 16, 18, provided no part of either the driver's or the passenger's body is within a predetermined region 44 close to the control panel 14, then no signal will be detected from the primary receiver antenna 22. Under these conditions the head-up display unit 36 is not operated and the controlled system 10 is not altered.

If one of the users e.g. the driver 40 brings his hand 46 into the region 44 then the signal from the transmitter antenna 26 will be transmitted through his body to the primary receiver antenna 22 where it is received sufficiently strongly to be detected by the CPU 30. This is because the body of the driver 40 has different dielectric properties from the surrounding air and is better able to transmit the signal from the control antenna to the driver's seat antenna 26. The body of the driver 40 therefore provides a signal path through which the signal travels from the transmitter antenna 26 to the primary receiver antenna 22. When the signal is received by the primary receiver antenna 22, the CPU 30 activates the head-up display unit 36 which projects onto the windscreen a HUD image 37 representing the current positions of the controls 16, 18.

During the previously described operation, when the driver's hand 46 is not within region 44, the control panel 14 is not illuminated and is, in fact, concealed since it has the appearance of the rest of the dashboard for aesthetic effect. Once the driver's hand 46 enters the region 44, the control panel 14 becomes illuminated at a predetermined level of light intensity and is thus no longer concealed. As the driver's hand 46 moves closer to the primary receiver antenna 22, the signal received by the primary receiver antenna 22 increases in amplitude and as a result the level of illumination of the control panel 14 gradually increases. If the driver's hand 46 is withdrawn from the region 44, the control panel 14 becomes concealed once more.

Figure 4:
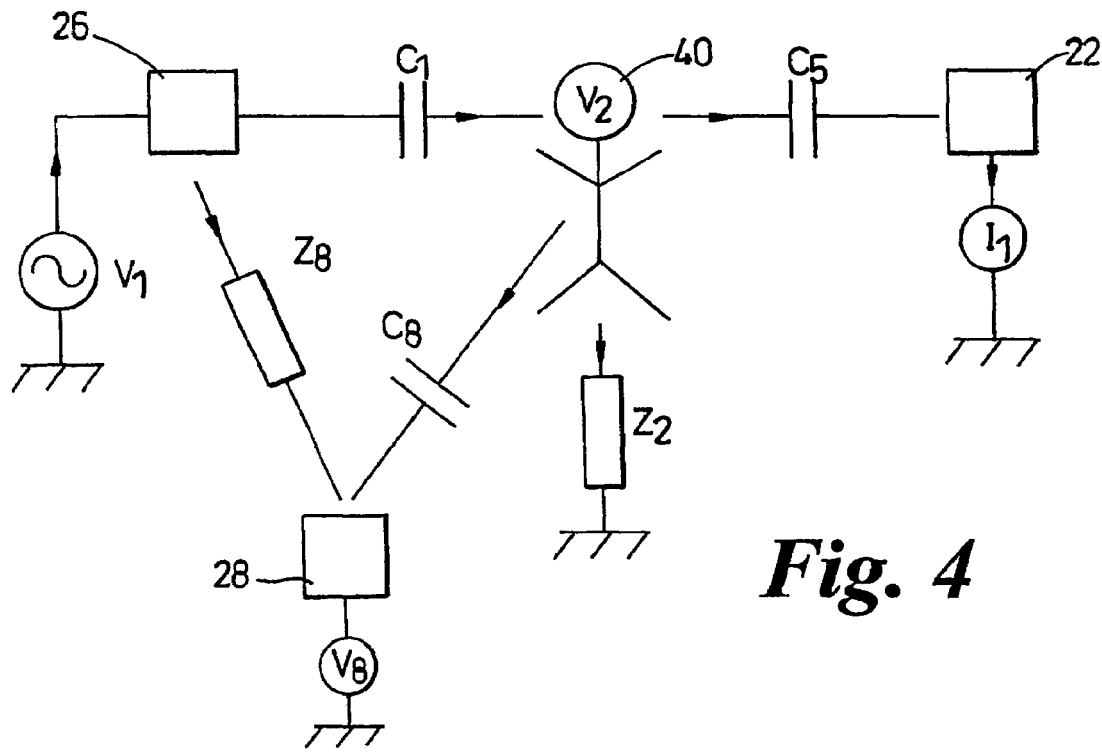
FIG. 4 is a schematic circuit diagram showing a user operating the system.

Referring to FIG. 4, a simplified schematic circuit diagram is shown for the driver 40 operating the subsystem 10 in the absence of a passenger 42. $C_1$ denotes the capacitance between the driver 40 and the transmitter antenna 26 which can be arranged to be approximately constant for any person sitting in the driver or passenger seat.

$C_5$ denotes the capacitance between the driver's hand 46 and the primary receiver antenna 22, and $C_8$ denotes the capacitance between the driver 40 and the reference receiver antenna 28 which can be arranged to be approximately constant. $Z_2$ represents the impedance between the driver 40 and ground. This is typically a capacitance between the driver 40 and the shell of the vehicle. If the driver touches metalwork within the vehicle, $Z_2$ decreases greatly and may become partially resistive. This situation could occur, for example, if the driver 40 touches grounded metalwork in the form of a handbrake button, a key lock surround or exterior door panels (if windows are open).

$Z_2$ may vary for other reasons, for example the size of the driver 40 can affect $Z_2$ (a larger person will have larger coupling to ground).

$Z_8$ represents the impedance relating to direct coupling between the transmitter antenna 26 and the reference receiver antenna 28. This coupling must be kept to a minimum and so $Z_8$ needs to have a relatively high value, otherwise measurements taken of the signal at the reference receiver antenna 28, which is intended to measure the voltage on the driver 40, will be contaminated by signals which have not passed through the user.

$V_1$ is the voltage of the original transmitted signal. $V_2$ represents the voltage on the driver 40. $V_2$ may be affected significantly by changes in $Z_2$ as described above (by a factor of 10 or more) and $V_2$ is therefore required to be measured directly in order to calibrate measurements which indicate the level of the detected signal, at the primary receiver antenna 22 to calculate $C_5$ (see below).

$V_8$ is the voltage measured at the reference receiver antenna 28. This is used to measure $V_2$ (which is why $Z_8$ needs to be kept high as described above).

$I_1$ is the current measured at the primary receiver antenna 22. From this, a value for $C_5$ is obtained since $C_1$ can be assumed to be much greater than $C_5$ and so $I_1$ is directly proportional to $C_5$.

$C_5$ is inversely proportional to the separation between the driver's hand 46 and the reference receiver antenna 22, if it is assumed that the dielectric constant of the air between them 22, 46 remains constant and that the driver 40 uses a fingertip of constant size and shape to operate the controls 16,18.

Therefore if $V_1$ is known, and $C_1$ and $C_8$ are approximately known, and $Z_8$ is assumed to be large, then $V_2$ can be determined. This enables $C_5$ to be determined from $V_2$ and $I_1$.

Figure 5:
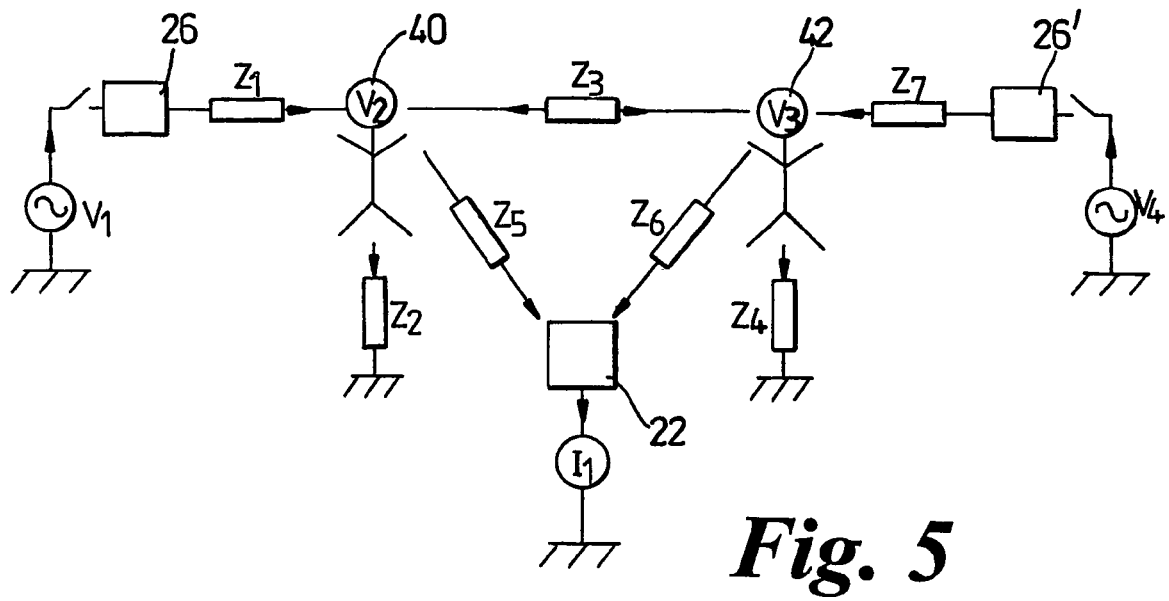
FIG. 5 is a schematic circuit diagram showing two users operating the system.

Referring to FIG. 5, a schematic circuit diagram is shown for a situation in which the driver 40 is accompanied by a passenger 42 in the vehicle, and either of them could operate the subsystem 10.

$V_1$ and $V_4$ represent the voltages of the signals transmitted through the driver transmitter antenna 26 and the passenger transmitter antenna 26' respectively.

$Z_1$ and $Z_7$ denote the impedances between the driver and passenger transmitter antennae 26, 26' and the driver 40 and passenger 42 respectively.

$V_2$ and $V_3$ are the voltages on the driver 40 and passenger 42 respectively. These are required to be measured to calibrate the measurements taken at the primary receiver antenna 22. This is done via the driver and passenger reference receiver antennae 28, 28' (not shown in FIG. 5, for clarity). The reference receiver antennae 28, 28' operate similarly to the situation previously described where only the driver 40 is present to operate the subsystem 10.

$Z_2$ and $Z_4$ denote the impedances between ground and the driver 40 and passenger 42 respectively.

In this situation, an additional inductance component, $Z_3$ represents the impedance between the driver 40 and passenger 42 since they may not be in perfect electrical isolation for measurement purposes. $Z_3$ may vary significantly depending upon the degree of coupling between the driver 40 and passenger 42 e.g. if they are holding hands $Z_3$ may be very low. The effect of $Z_3$ is to introduce an extra ground load to the driver 40 and the passenger 42 in contrast to the previously described situation in which only the driver 40 is present. This has an effect on $Z_5$ and $Z_6$ which are the impedances between the primary receiver antenna 22 and the driver 40 and passenger 42 respectively.

$I_1$ is the current measured at the primary receiver antenna 22.

By transmitting signals through the driver 40 and passenger 42 alternately and taking measurements from each of the driver/passenger reference receiver antennae 28, 28' and the primary receiver antenna 22 at each transmission stage, it is possible to eliminate the effect of, and therefore the need to measure, $Z_3$ (as explained below).

The quantities measured at each receiver antenna 26, 26', 28, 28' have complex values and so measurements are made in two phases.

Initially a signal is transmitted through the driver transmitter antenna 26 (the driver transmit phase) and then a signal is transmitted through the passenger transmitter antenna 26' (the passenger transmit phase). Measurements are made in each of these phases as follows.

In the driver transmit phase, the voltage on the passenger 42 is measured, $V_{3D}$, as is the voltage on the driver 40, $V_{2D}$. The current at the primary receiver antenna 22 is also measured, $I_{1D}$. The methods used for measuring these values is detailed further below.

In the passenger transmit phase, the voltage on the passenger, $V_{3P}$, the voltage on the driver, $V_{2P}$, and the sensor current, $I_{1P}$, are measured.

The following calculations are then performed:

Considering the passenger transmit phase, the sum of the currents flowing in $Z_5+Z_6$ is $I_{1P}$ and these currents are generated by $V_{2P}$ and $V_{3P}$.

Therefore:

$$I_{1P} = \frac{V_{2P}}{Z_5} + \frac{V_{3P}}{Z_6} \qquad (1)$$

Similarly, for the driver transmitter phase, $$I_{1D} = \frac{V_{2D}}{Z_5} + \frac{V_{3D}}{Z_6} \quad (2)$$

From (1)

$$Z_6 = \frac{V_{3P}}{I_{1P} - \frac{V_{2P}}{Z_5}}$$

Similarly, from (2)

$$Z_6 = \frac{V_{3D}}{I_{1D} - \frac{V_{2D}}{Z_5}} \quad (3)$$

Therefore:

$$Z_6 = \frac{V_{3P}}{I_{1P} - \frac{V_{2P}}{Z_5}} = \frac{V_{3D}}{I_{1D} - \frac{V_{2D}}{Z_5}}$$

and $$V_{3D}\left(I_{1P} - \frac{V_{2P}}{Z_5}\right) = V_{3P}\left(I_{1D} - \frac{V_{2D}}{Z_5}\right)$$

Multiplying both sides by $Z_5$:

$$V_{3D}Z_5 I_{1P} - V_{3D}V_{2P} = V_{3P}Z_5 I_{1D} - V_{3P}V_{2D}$$

and therefore:

$$Z_5 = \frac{V_{3D}V_{2P} - V_{3P}V_{2D}}{V_{3D}I_{1P} - V_{3P}I_{1D}}.$$

Thus, $Z_5$ is measured independently of $Z_3$ and other impedances within the system. $Z_6$ is obtained by substituting the value of $Z_5$ into equation (3).

The capacitance between the driver 40 or passenger 42 and the primary receiver antenna 22 is inversely proportional to the distance between the driver's or passenger's finger and the primary receiver antenna 22, as previously explained. It is thus possible to obtain an indication of that distance. The CPU 30 processes this information to allow the intensity of illumination of the control panel 14 to be increased at a predetermined rate as the finger of the driver 40 or passenger 42 approaches it.

When the driver's hand 46 touches one of the controls 16, 18, for example one of the rotary controls 16, the contact switch 32 associated with that control 16 detects this contact and the CPU 30 modifies the image 37 to indicate to the driver 40 which of the controls 16 his hand is touching, in this case by highlighting the representation of that control. As the driver 40 moves the rotary control 16 the head-up display unit 36 alters the HUD image 37 to indicate to the driver 40 the changing position of the control 16 so that he can determine what inputs he is making to the system controller 12. When the driver 40 has altered the controls to the desired setting, he withdraws his hand 46. When his hand 46 leaves the region 44, the primary receiver antenna 22 ceases to receive the signal from the driver transmitter antenna 26, and the CPU 30 detects the removal of the driver's hand 46. It then de-activates the head-up display unit 36.

It will also be appreciated that displays other than head-up displays can also form part of the system and be controlled in a manner which depends on the proximity of the user operating the user input. For example in an in-car entertainment system which includes a message centre for indicating the operation of the system visually using text or images, and which includes the ability to communicate information audibly, the system can be controlled so as to provide a visual output if the passenger 42 is identified as operating the system, but to produce an audible output of the driver 40 is identified as using the system. This ensures that use of the system by the passenger 42 will not distract the driver 40, but the driver 40 can operate the system without needing to look at the visual display.

It is preferable for the driver 40 to remain as close as possible to the driver reference receiver antenna 28 but this is not always practical. If the driver 40 leans away from the back 29 of the seat, it becomes more difficult to determine $V_2$ since the coupling between the driver 40 and the driver reference receiver antenna 28 is affected.

Therefore as the distance between the driver 40 and the driver reference receiver antenna 28 increases, $V_2$ decreases. It is difficult to compensate for this variation in $V_2$ by simply providing an amplifier circuit and maintaining $Z_8$ at a high level so that $V_2$ can be accurately measured.

Figure 6:
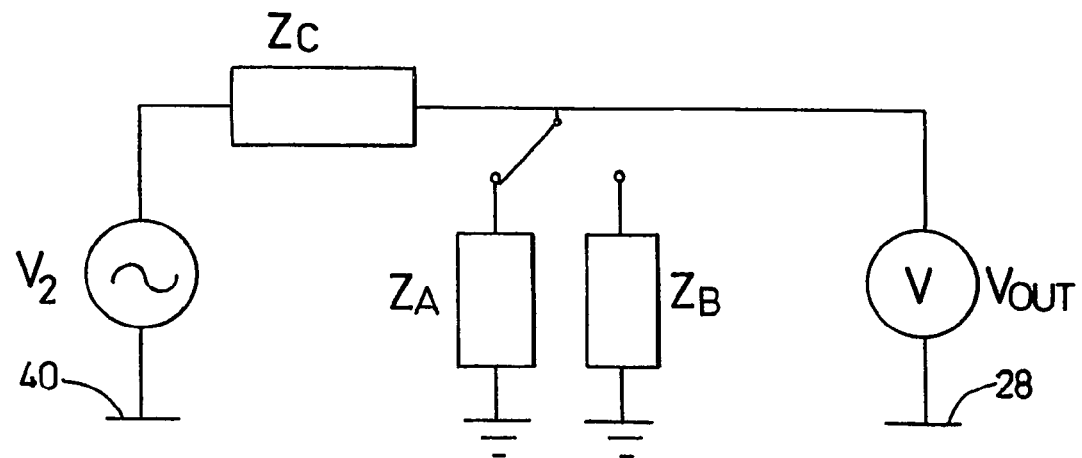
FIG. 6 is a schematic circuit diagram illustrating a switched impedance technique used to measure a voltage on a user.

Instead a switched impedance technique is used to determine $V_2$, even if there is a large gap between the driver 40 and the driver reference receiver antenna 28. Referring to FIG. 6, a schematic circuit diagram is shown, in which $V_2$ represents the voltage on the driver 40. $Z_c$ represents the capacitance between the driver 40 and the driver reference receiver antenna 28, $V_{out}$ is a measured output voltage at the reference antenna 28 and $Z_A$ and $Z_B$ represent different known load impedances. The CPU 30 controls a switching mechanism between $Z_A$ and $Z_B$ and $V_{out}$ is measured initially when $Z_A$ completes the circuit and then when $Z_B$ completes the circuit. The following calculation is performed:

When load impedance $Z_A$ is switched in:

$$V_{out} = V_2 \frac{Z_A}{Z_A + Z_C} = V_A \quad (4)$$

When load impedance $Z_B$ is switched in:

$$V_{out} = V_2 \frac{Z_B}{Z_B + Z_C} = V_B \quad (5)$$

from (4) $Z_C + Z_A = \frac{V_2}{V_A} Z_A,$ from (5) $Z_C + Z_B = \frac{V_2}{V_B} Z_B,$ Therefore $$Z_A - Z_B = V_2 \left\{ \frac{Z_A}{V_A} - \frac{Z_B}{V_B} \right\} = V_2 \left\{ \frac{Z_A V_B - Z_B V_A}{V_A V_B} \right\} \quad (6)$$

and $$V_2 = \frac{(Z_A - Z_B) Z_A V_B}{Z_A V_B - Z_B V_A}$$

Thus, $V_2$ is measured independently of the capacitance between the driver 40 and the reference receiver antenna 28.

If $Z_2$ is large compared to $Z_A$ and $Z_B$ (e.g. if the driver 40 leans very far away from the back 29 of the seat), it is not possible to obtain an accurate value for $V_2$ using this method since background noise becomes more significant.

Figure 6A:
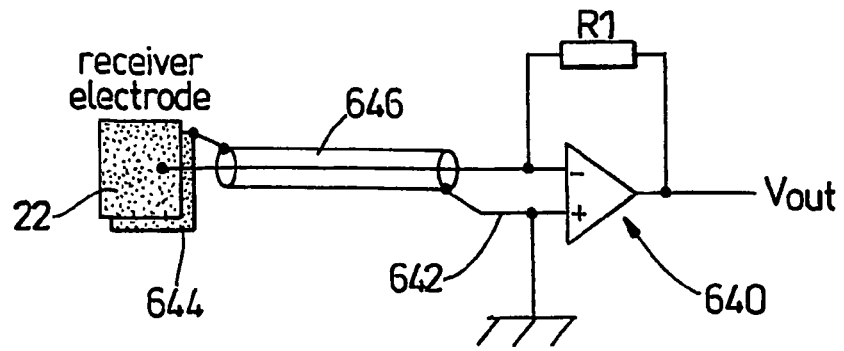
FIG. 6a shows a primary receiver current amplifier circuit of the system.

Referring to FIG. 6a, the current at the primary receiver antenna 22, is passed through a conventional amplifier circuit 640 with its inverting input 642 maintained as a virtual earth, which allows a shield 644 associated with the primary receiver antenna 22 to be connected to ground along with any cable screening 646. This means that the amplifier circuit is relatively insensitive to capacitance between the primary receiver antenna 22 and any screens which may be problematic if high voltage inputs are to be processed. The output voltage of the amplifier circuit 640 is of a suitable level for processing by a detector circuit by virtue of a resistor which sets the gain of the amplifier in a standard manner.

Figure 6B:
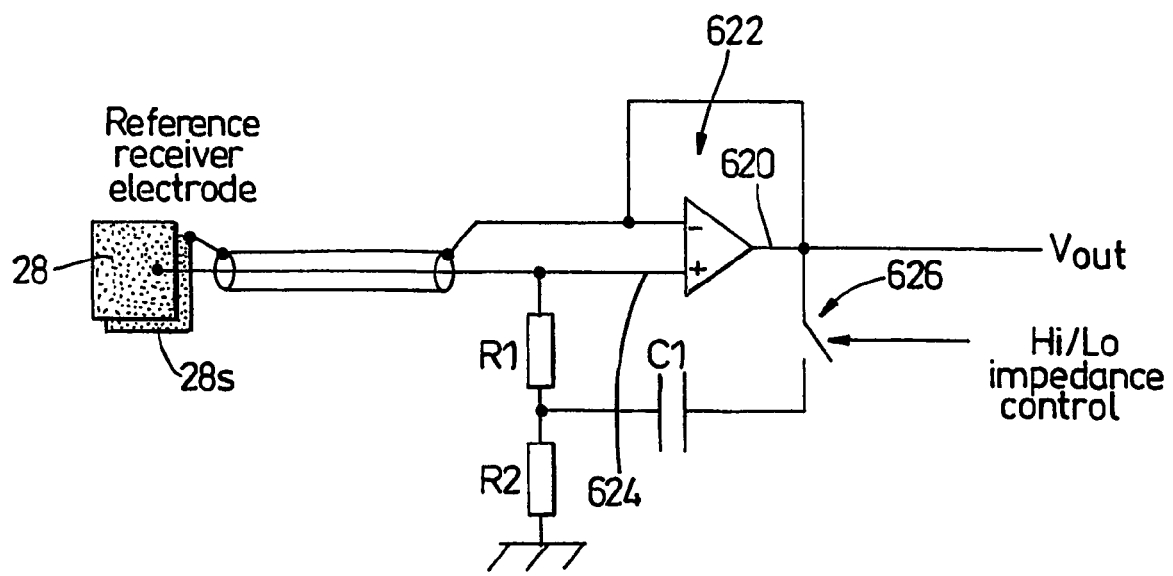
FIG. 6b shows a reference receiver buffer circuit of the system.

Before sending to a detector circuit (described in more detail below), the voltage at the driver reference receiver antenna 28 is buffered locally. The same also applies to the voltage at the passenger reference receiver antenna 28' circuit. Best performance is obtained when the input impedance to the buffer is high and referring to FIG. 6b this is achieved by bootstrapping the output 620 of a conventional operational amplifier 622 buffer circuit to its input 624. An electronic analogue switch 626, controlled by the CPU 30, connects the output 620 to a capacitor C1 which is connected via a resistor R1 to the input 624, and via a further resistor R2 to ground. The switch 626 is used to switch in and out the bootstrapping to implement the switched impedance technique. When the bootstrapping is switched in, the input impedance is limited by the operational amplifier characteristics and the circuit layout. When it is switched out, the input impedance is set by relatively low value resistors R1, R2). Both the "high" and "low" impedances are fixed and reproducible for accurate measurement of $V_2$.

Figure 6C:
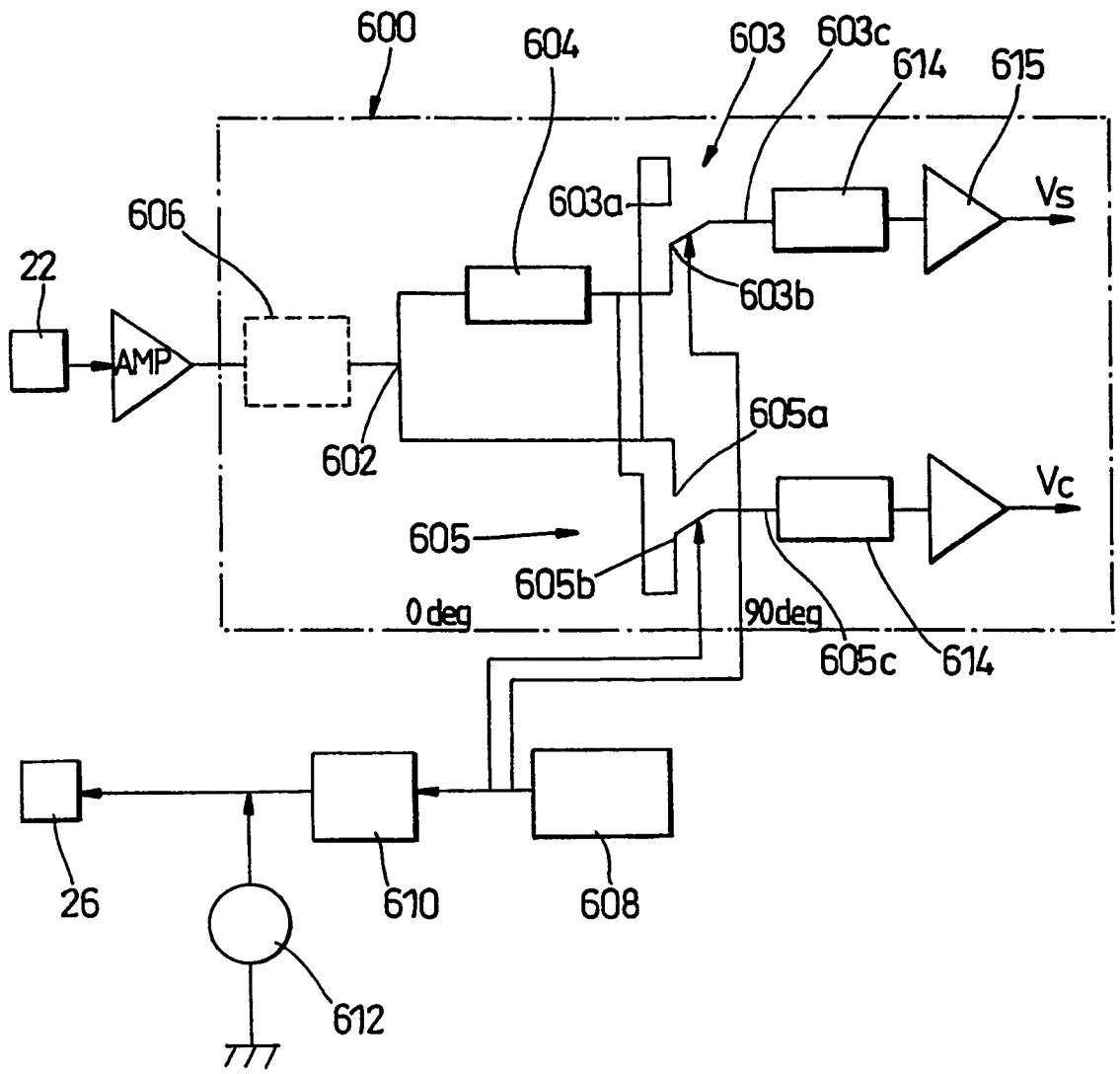
FIG. 6c is a schematic circuit diagram of a detector circuit of the system.

Buffering, as previously described, is intended to provide pure low amplitude versions of the transmitted signal which have been picked up by the reference receiver antenna 28. However, real signals are contaminated by noise and interference—for example, due to internal circuitry and external noise sources within the vehicle. Referring to FIG. 6c, a synchronous detector circuit 600 is used to create a very narrow band pass filter, which is locked to the frequency of the signal transmitted by the transmitter antenna 26. The resulting signal is rectified as described below to produce a DC output signal whose level represents the capacitance level between the driver 40 and the driver reference receiver antenna 28. A capacitive input multiplexer is arranged to allow the detector circuit 600 to be used for the primary and reference signals for both the driver 40 and the passenger 42.

The synchronous detector circuit 600 includes an input 602 and two switches 603, 605 each having one input terminal 603a, 605a connected directly to the input 602 and another 603b, 605b connected to the input 602 via an inverter 604. Each switch 603, 605 has one output terminal 603c, 605c which is connected alternately to the two switch input terminals 603a, 603b, 605a, 605b. Each switch output terminal 603c, 605c is connected via a low pass filter 614 and an amplifier 615 to a respective circuit output $V_S$, $V_C$. The switches 603, 605 are operated 90° out of phase with each other. They are controlled from the output of the signal wave oscillator 608 which produces, via a sine wave shaper 610, the signal to the transmitting antenna 26. One of the switches 605 is operated in phase with the oscillator 608 and the other 603 90° out of phase. Thus each of the outputs, $V_S$, $V_C$ of the electronic changeover switches 603, 605 is the received buffered signal multiplied by a square wave at an identical frequency to the transmitted signal with one square wave being in phase with the input signal and the other being 90° out of phase. For each output $V_S$, $V_C$, if the received signal and square wave are in phase, the output is a series of positive sinusoidal half cycles. When these pass through a low pass filter 614, an average, positive DC voltage (proportional to the received signal's amplitude) results. If the two signals are in anti-phase, a series of negative sinusoidal half cycles results. The CPU 30 measures this voltage using an analogue to digital converter.

For each output $V_c$, $V_s$, if the received signal and square wave signal are 90° apart or not at the same frequency, the average result is zero and this is how the detector rejects noise and interference.

For either one of the outputs $V_S$, $V_C$, if the received and transmitted signals are at an arbitrary phase difference, the received signal amplitude cannot be deduced. This problem is solved by detecting signals $V_S$, $V_C$ which are 90° apart, as described above. The amplitude of a detected signal may then be obtained in a standard manner by summing the squares of the DC voltage levels, $V_S$ and $V_C$ obtained from the two signals and calculating the square root. The phase of the received signal may be calculated from the arctangent of the ratio of the two DC voltage levels, $V_S$, $V_C$. The amplitude and phase are both required to be known since the calculations described previously are all in vector form.

The characteristics of the low pass filter 614 define the response rate and selectivity of the detector 600. A filter with a long time constant will take a longer time to settle but the detector will be more selective and therefore more immune to interference. As an alternative a simple first order RC filter may be satisfactory but speed and selectivity is improved by using an active low pass filter.

A simple band pass filter 606 may be provided before the synchronous detector to remove odd harmonics of the transmitter frequency.

The detector 600 may be used to process many inputs by multiplexing. This may have an effect on the required update rate and the settling time of the detector may also limit the number of inputs which may sensibly be used through a single detector.

Therefore as described above signals from the primary receiver antenna 22 and the reference receiver antenna 28 are provided as suitable DC signals for processing by the CPU 30 in the following manner.

Referring to FIG. 7, the CPU 30 initiates the driver transmit phase by transmitting a signal at step 701 through the driver transmitter antenna 26. At steps 702 and 703 the passenger and driver reference voltages are read. At step 704 the signal from the primary receiver antenna 22 (as detailed below) associated with the control panel 14 is read. Steps 704b, 704c etc. relate to the reading of signals from other receiver antennae associated with other similar user inputs which are not shown for clarity. Once step 704 is complete, the driver transmit phase is complete. Next the passenger transmit phase is initiated by transmitting a signal through the passenger transmitter antenna 26—at step 705. At steps 706 and 707 the signals at the passenger and driver reference receiver antennae 28', 28 are read. At step 708a, the signal at the primary receiver antenna 22 is read. At steps 708b, 708c etc. signals are read from other receiver antennae associated with other user input as previously described. Once step 708 is complete, the passenger transmit phase is complete.

At step 709 DC offset values are acquired if they are due (as explained in further detail below). At step 710a, 710b, etc. capacitance values are calculated between each of the passenger and driver and each receiver read at steps 704a, 704b etc. At step 711a, 711b etc. the proximity of the passenger 42/driver 40 is calculated using the values obtained in step 710a, 710b etc. At step 712, the results are filtered to remove "rogue" readings and variations due to noise as detailed further below. At step 713 the results from each receiver which has been read are assigned a status to determine whether it is being operated by the passenger, driver, both or neither and this step is outlined in more detail below. The CPU 30 then continues the cycles through these steps rotating from 700 to 713.

Steps 702, 703, 706 and 707 are now described in more detail. The measurement of the voltage on the body of the passenger 42 and of the voltage on the body of the driver 40 uses the switch impedance method previously described. The CPU 30 cycles through the following sequence to measure these voltages. Firstly the capacitive input multiplexer is switched to receive a signal from the relevant reference receiver antenna 28, 28'. The reference receiver buffer is switched to its "high" impedance setting. There is a delay while the detector settles. The complex voltage $V_A$ is read via two ADC values (required to measure both phase and magnitude) as previously described. The reference receiver buffer is next switched to its "low" impedance setting. There is a delay while the detector settles. The complex voltage $V_B$ is read (once again two ADC values are required). The voltage on the driver 40/passenger 42 is calculated using the formula previously derived (equation (6)). The value is then stored. As previously stated it should be noted that all of the values indicated are complex values.

Steps 704a, 704b etc and 708a, 708b etc will now be described in more detail. Referring to steps 704a and 708a, the signal received at the primary receiver antenna 22 must be read for both the driver and passenger transmit phase using the following sequence. The capacitive multiplexer is switched to read the signal from the primary receiver antenna 22. There is a delay while the detector settles. The complex voltage at the detector is read and the channel's DC offset is subtracted (described in detail below). The value for the complex voltage is stored. This procedure is repeated for steps 704b etc and 708b etc which relate to the reading of signals at receivers associated with other user inputs.

Step 709 is now described in more detail. At predetermined intervals (e.g. at start up and then once per minute), the CPU 30 suspends the acquisition of values in the driver and passenger transmit phases to measure the DC offset values within the system. These offset values may be due to errors and drift within the detector or may be attributable to signal leakage within the ICP (Integrated Circuit Package). The CPU 30 cycles through the following sequence to remove the DC offset. Initially the driver and passenger transmitters 26, 26' are deactivated. The voltage on the passenger 42 is read several times through the passenger reference receiver antenna 28', this signal is summed, averaged and stored. The voltage on the driver 40 is read several times through the driver reference receiver antenna 28, then summed, averaged and stored. Referring to step 709a, the signal at the primary receiver antenna 22 is obtained several times, summed, averaged and stored. This is repeated at steps 709b, 709c etc for receivers associated with other user inputs. An average of three to five readings at each stage has been shown to work efficiently without causing the system to pause noticeably and thus affect efficiency. The stored DC offset values are then used to subsequently subtract from their respective signal readings when transmitting to give an accurate reference level.

Steps 710a, 710b etc are now described in more detail. Referring to step 710a once the voltage values for the driver and passenger transmit phases have been acquired from the reference receiver antennae 28, 28' and the primary receiver antenna 22, they can be combined to give an impedance value between the passenger/driver and each reference receiver/primary receiver. This impedance is usually a capacitance but if the passenger/driver is touching the primary receiver antenna 22, it may comprise a combined resistance and capacitance. The impedance is eventually converted to a scalar value so this is not problematic. The impedance between the driver/passenger and the primary receiver antenna 22 is then calculated in accordance with the formula previously derived to obtain $Z_5$ and $Z_6$ (the voltages and currents are measured in raw ADC counts). $Z_5$ and $Z_6$ are measured in units related to ohms by a constant derived from the hardware's characteristics. $Z_5$ and $Z_6$ are complex values and each is converted into scalar Magnitudes $M_5$ and $M_6$ which represent the impedance between the driver/passenger and the primary receiver antenna 22. This value decreases as the distance therebetween decreases.

Steps 711a, 711b etc will now be described in more detail. The value of $M_5$ or $M_6$ are used as indices to a look up table to provide a value for the proximity of the driver/passenger and the relevant sensor (e.g. the primary receiver antenna 22). The contents of the look up table will depend upon the area of the sensor and sensitivity—this may be derived experimentally.

Referring to step 712, large errors in sensitivity compensation can occur due to sudden changes to the system during the measurement cycle. For example, if the driver 40 is drumming their fingers on a grounded door panel some measurements within a set may be made whilst the driver 40 is effectively grounded and some measurements in the same set may be made while the driver is ungrounded. This will lead to large variations in the calculated proximity between the driver 40 and the primary receiver antenna 22. However, it is almost certain that the next few complete sets of measurements will be made with the driver 40 in one state or the other and therefore without the errors in proximity calculation. For each sensor, "rogue" readings may be rejected by examining a sliding window of the most recent, and n (predetermined value) previous proximity values and discarding any values which lie outside this window. The window may be organized by sorting the values obtained in orders of magnitude and retaining median values. This median filter inserts a delay which increases with an increasing window size. A minimum window size of 3 values has been tested successfully.

A low pass smoothing filter can be used to attenuate variations due to random noise. A filter of the form:

$$y = \alpha x_{new} + (1-\alpha) y_{prev}$$

$$y_{prev} = y$$

$$x_{prev} = x_{new}$$

where $0 < \alpha < 1$, provides a filter output v by combining a fraction of the latest reading $x_{new}$ with some of the previous filter output $y_{prev}$, slowing down the response to change and thereby reducing the effects of noise. Responses to large changes may be speeded up whilst small changes may be heavily smoothed by increasing the value of $\alpha$ with the size of the difference between $x_{new}$ and $x_{prev}$. This type of filtering has been found to eliminate noise without slowing down the system.

Small changes in measured proximity may be eliminated altogether by applying hysteresis, which produces a steady output value until the input deviates by more than a set amount from the current output value. This is also used for eliminating jitter which could occur if making a binary decision within the system were based upon a measurement affected by random noise.

Steps 713a, 713b etc will be described in more detail. For each relevant receiver e.g. the primary receiver antenna 22 there will be a value for proximity obtained at step 711 for each of the driver 40 and passenger 42. An algorithm is used to decide whether the driver/passenger is operating the controls associated with that particular receiver.

Various modifications may be made to the present invention without departing from its scope.

It will be appreciated that the system of the present invention may be used to selectively vary any control mechanism dependent upon proximity of a user to any surface associated with a suitable primary receiver. The exact form and position of the primary receiver and transmitter are limited only by practical requirements e.g. space in a vehicle.

In an alternative arrangement, the primary receiver antenna may be provided in a single switch for example.

Figure 8:
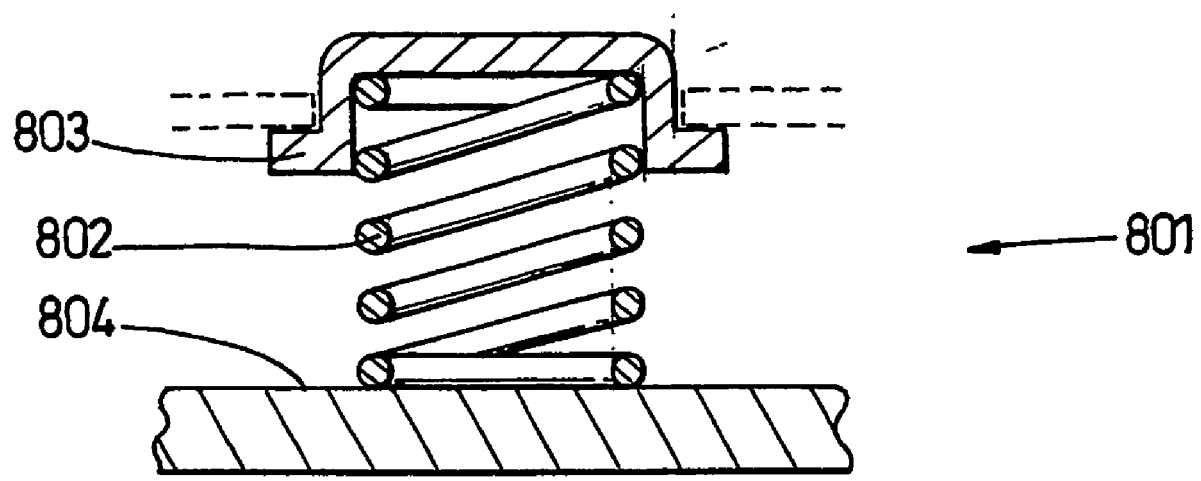
FIG. 8 is a sectional side-view of a button of the system.

Referring to FIG. 8, a switch 801 is shown comprising a conductive spring member 802 joining a thumb/finger button 803 to a copper PCB 804, which is joined to the primary receiver detector circuit.

Other configurations of transmitter/receiver are possible. Each antenna may be in the form of a conductive wire or a plate. At the user input these could be mounted in, on or adjacent any knob, switch or control panel area which requires proximity sensing. A touch screen user input may comprise conductive film or coating to form a receiver/transmitter antenna.

Receiver/transmitter antennae which are associated with the user may be located in a footwell of the vehicle or in any other location sufficiently close to the user.

The system may be adapted to respond audibly, so as not to visually distract a driver for example.

The invention claimed is:

1. A sensing system for sensing the proximity of a part of a user to a control input for a vehicle sub-system, the system comprising a transmitter adapted to transmit a signal, a primary receiver adapted to receive the signal via the user as a primary signal, one of the transmitter and primary receiver being adapted to be associated with the user and the other being associated with the control input, a reference receiver adapted to be associated with the user and to receive the signal via the user as a reference signal, and a controller arranged to receive the reference signal and the primary signal and to determine from them said proximity.

2. A system according to claim 1, in which the controller is arranged to determine from the reference signal the voltage of the user.

3. A system according to claim 2, in which the reference receiver is connected alternately through different impedances and the reference signal in each case measured to obtain a measure of the voltage on the user substantially independently of capacitance, and therefore distance, between the user and the reference receiver.

4. A system according to claim 1, in which the transmitter is adapted to transmit an alternating voltage signal.

5. A system according to claim 4, in which the transmitter is adapted to transmit a sinusoidal alternating signal.

6. A system according to claim 1 in which the controller is arranged to use the primary and reference signals to determine a measure of a capacitance between the user and the primary receiver.

7. A system according to claim 6, in which the controller is arranged to use the measure of capacitance between the user and the primary receiver to determine the separation of said part of the user from the control input.

8. A system according to claim 1, in which the reference receiver comprises a high input impedance reference receiver for receiving the reference signal.

9. A system according to claim 1, in which the reference receiver comprises a detector circuit arranged to provide a measure of a magnitude and phase of at least one of the reference signal and the primary signal.

10. A system according to claim 9, in which a multiplexer is provided to allow the detector circuit to provide the measure of the magnitude and phase of the reference signal and the primary signal alternately.

11. A system according to claim 10, in which a current input buffer circuit is arranged to buffer the primary signal before it is input to the detector circuit.

12. A system according to claim 9, in which the detector circuit comprises a filter to filter out noise and interference not at the frequency of the transmitted signal.

13. A system according to claim 9, in which the detector circuit comprises synchronisation means arranged to obtain measurements from the primary signal or reference signal in phase with the transmitted signal and 90.degree. out of phase with the transmitted signal.

14. A system according to claim 9, in which a buffer circuit is arranged to buffer the reference signal before it is input to the detector circuit.

15. A system according to claim 1, in which the control input comprises a portion arranged to be illuminated in use and the controller is arranged to vary the intensity of illumination of said portion as the separation of the user from the control input varies.

16. A system according to claim 15, in which the intensity of illumination of the control input is adapted to increase as the separation of the user from the control input decreases.

17. A system according to claim 15, in which the control input is adapted to become illuminated once the separation of the user from the control input falls below a predetermined threshold value.

18. A system according to claim 17, in which the control input is adapted to be concealed until the separation falls below the threshold value.

19. A system according to claim 1, in which the subsystem comprises a display to present information to the user and a property of the display is variable with the separation of the user from the control input.

20. A system according to claim 1, in which the transmitter comprises a transmitter aerial.

21. A system according to claim 20, in which the transmitter aerial comprises a flexible transmitter plate.

22. A system according to claim 1, in which the primary receiver comprises a primary receiver aerial.

23. A system according to claim 1, in which the reference receiver comprises a reference receiver aerial.

24. A system according to claim 23, in which the reference receiver aerial comprises a flexible plate.

25. A system according to claim 1, in which the transmitter is in a position arranged to be associated with the user and the primary receiver is adapted to be associated with the control input.

26. A system according to claim 25, in which the transmitter is arranged to be mounted in a seat of the vehicle such that the user is a person sitting on the seat.

27. A system according to claim 26, in which the reference receiver is arranged to be mounted in the seat of the vehicle in a position spaced from the transmitter.

28. A system according to claim 27, in which the control input includes a screen comprising a conductive layer which forms the primary receiver.

29. A system according to claim 25, in which the primary receiver is arranged to be mounted at or adjacent to the control input.

30. A system according to claim 29, in which the primary receiver comprises a conductive wire mounted around the control input.

31. A system according to claim 1, in which the transmitter further comprises a transmitter shield associated with the transmitter to reduce coupling of the transmitter with at least one of the reference receiver and the primary receiver through a route other than via the user.

32. A system according to claim 1, in which the reference receiver further comprises a reference shield associated with the reference receiver to prevent coupling between the transmitter and the reference receiver by any route other than via the user.

33. A system according to claim 1, in which the control input is a hand operated input member.

* * * * *